(12) United States Patent
Brown et al.

(10) Patent No.: US 8,655,763 B2
(45) Date of Patent: Feb. 18, 2014

(54) MICROFINANCE FUNDS AGGREGATION FOR A RETAIL INVESTOR

(75) Inventors: Robert Scott Brown, Memphis, TN (US); Ashwini Narayanan, Menlo Park, CA (US); Amyn Thawer, Saratoga, CA (US)

(73) Assignee: eBay, Inc., San Jose, CA (US)

( * ) Notice: Subject to any disclaimer, the term of this patent is extended or adjusted under 35 U.S.C. 154(b) by 912 days.

(21) Appl. No.: 12/492,014

(22) Filed: Jun. 25, 2009

(65) Prior Publication Data

US 2010/0332410 A1    Dec. 30, 2010

(51) Int. Cl.
*G06Q 40/00* (2012.01)
*G06Q 40/06* (2012.01)

(52) U.S. Cl.
CPC ..................... *G06Q 40/06* (2013.01)
USPC .............. 705/36; 705/35; 705/37; 705/38; 705/39; 705/40; 705/80; 705/26.3; 705/7.11; 715/751

(58) Field of Classification Search
USPC ........... 705/35, 37, 38, 39, 40, 80, 26.3, 7.11; 715/751
See application file for complete search history.

(56) References Cited

U.S. PATENT DOCUMENTS

| | | | |
|---|---|---|---|
| 2002/0133445 A1* | 9/2002 | Lessin | 705/36 |
| 2003/0018575 A1* | 1/2003 | Beggins et al. | 705/38 |
| 2003/0028467 A1* | 2/2003 | Sanborn | 705/36 |
| 2004/0039675 A1* | 2/2004 | Wallman | 705/36 |
| 2004/0254873 A1* | 12/2004 | Loveland | 705/36 |
| 2006/0184450 A1* | 8/2006 | Ely et al. | 705/38 |
| 2008/0208693 A1* | 8/2008 | Milstein et al. | 705/14 |
| 2008/0243664 A1* | 10/2008 | Shavit et al. | 705/35 |
| 2008/0294546 A1* | 11/2008 | Flannery | 705/38 |
| 2009/0037347 A1* | 2/2009 | Grigsby | 705/36 T |
| 2009/0063323 A1* | 3/2009 | Caffrey et al. | 705/37 |
| 2009/0076941 A1* | 3/2009 | Schneierson et al. | 705/37 |

* cited by examiner

*Primary Examiner* — Tien Nguyen
(74) *Attorney, Agent, or Firm* — Schwegman, Lundberg & Woessner, P.A.

(57) ABSTRACT

A computer-implemented system and method supporting microfinance funds aggregation for a retail investor are disclosed. A particular example embodiment includes receiving a purchase request at a host site from an investor at an investor site, the purchase request including information identifying a security offered for sale by a security issuer on the host site; facilitating payment for the security by the investor via a financial site; receiving confirmation of payment for the security; and sending confirmation of payment for the security to the investor.

19 Claims, 16 Drawing Sheets

MICROFINANCE FUNDS AGGREGATION FOR A RETAIL INVESTOR

BACKGROUND

1. Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2009 eBay Inc., All Rights Reserved.

2. Technical Field

This disclosure relates to methods and systems supporting computing and data processing systems. More particularly, a system and method supporting microfinance funds aggregation for a retail investor are described.

3. Related Art

Conventional network-based marketplaces (e.g. consumer websites) provide users with functionality to browse a collection of goods or services at a website and make purchases using a variety of means. For example, conventional credit cards can be used for an online purchase. In this case, the user enters the credit card number into a data field on a web form provided by a merchant or third party website. Conventional debit cards can be similarly used. Using these conventional financial systems and processes on the Web, users can shop and make purchases of goods or services over the Internet. However, in some cases, securities cannot be purchased with credit/debit cards.

The PayPal system is also a popular example of a conventional financial system and process to facilitate online consumer transactions. The PayPal system provides a user account created for each user wherein a user associates his/her credit card, debit card, or bank account with the PayPal account. Subsequently, the user can make secure purchases using the PayPal account without revealing his/her credit card number or financial information. When a user makes a purchase at a merchant site, the user can log in to the PayPal site to gain access to their PayPal account in order to complete the consumer transaction at the merchant site.

Conventional methods and systems can also enable consumers to purchase from a set of securities or investments currently available on the Web. The website, ETRADE.COM is an example of a site that provides security trading services on the web. The issuance of securities is highly regulated by several government agencies, including the Securities and Exchange Commission (SEC). SEC regulations have been applied to the availability of securities on the Web. One problem is that many current systems and processes for facilitating the exchange of securities are only cost-effective if large value or large volume securities are traded in a given transaction. In other words, conventional systems and processes for facilitating the exchange of securities are set up for sophisticated professionals who deal in large value/volume transactions. As such, current online systems do not efficiently support microfinance investments by small retail investors. A wide variety of securities can be purchased by retail investors through web interfaces through established brokerage houses. However, microfinance as an asset class is still emerging and is therefore not a class of securities available through mainstream brokerages. Because microfinance is emerging, it is targeting institutional and accredited investors and not retail investors. As such, mainstream brokerages do not provide a platform that facilitates retail investment in microfinance. Any security is issued by an issuer. Most organizations raising capital from commercial markets have to issue securities. These organizations tend to focus on large investors because it is more cost effective for them.

Thus, a system and method supporting microfinance funds aggregation for a retail investor are needed.

BRIEF DESCRIPTION OF THE DRAWINGS

Embodiments illustrated by way of example and not limitation in the figures of the accompanying drawings, in which:

Figure 9:
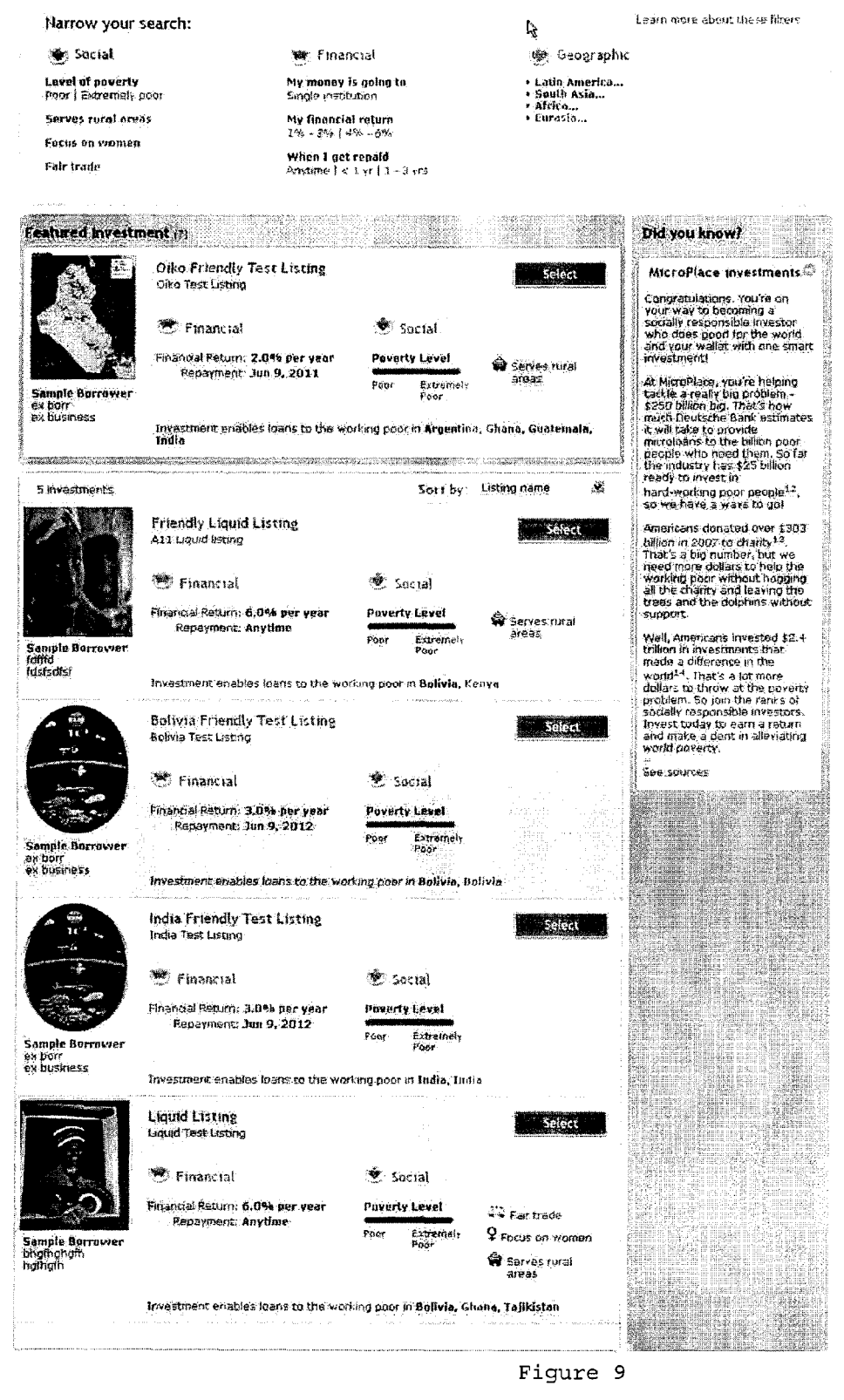

FIGS. 9-14 illustrate the user investment search, investment selection, order entry, payment selection, and order review processes of a particular embodiment.

DETAILED DESCRIPTION

Figure 1:
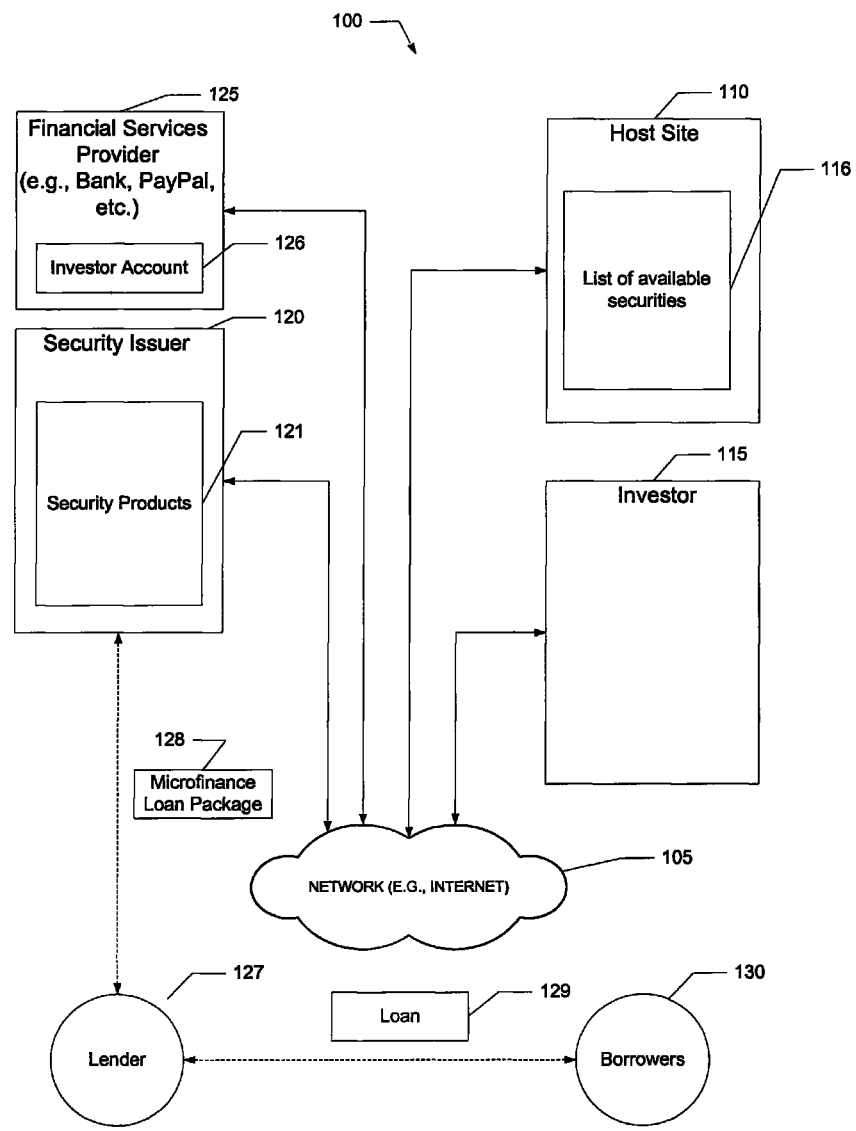
FIG. 1 illustrates an example embodiment of a networked system in which various embodiments may operate.

A computer-implemented system and method supporting microfinance funds aggregation for a retail investor are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method supporting microfinance funds aggregation for a retail investor. In other words, various example embodiments of the disclosed subject matter enable cost effective management of small amounts of capital from a large number of retail investors. As described herein, the microfinance funds aggregation system takes the cost out of the equation and facilitates small issuers to consider the retail channel as an option, because the various embodiments described herein make the retail channel cost effective.

An example embodiment of the microfinance funds aggregation platform can include the following networked components:

1. Investor Site: this is the interface to the investor through which they can create/manage an account, search for securities, pay for them, etc. The Investor site can use an application programming interface (API) to automatically communicate with financial systems for payment authorizations.

2. Administrative Site: There is an administration interface to load securities into the system. Once loaded into the system, these listings (electronic embodiments of the securities) can be published on the investor site.
3. Customer Service Site: This site is used by customer service representatives to manage investor accounts.
4. Transaction Processing Engine: This component represents the functionality that manages investor accounts, stores and processes transactions, manages the transaction lifecyle (e.g., purchase, approvals, etc.), calculates interest payments, communicates with payment processors, sends investor communications, etc.
5. Issuer Site: The system provides a workflow system for security issuers. This provides a way for issuers to view how much money they have raised, how many securities they have sold, approve transactions, interest payments, run reports etc.

The system can include an investment processor to accept an online purchase request for a security from an investor site and automatically initiate communication with a financial site to request authorization and payment from the financial site for the security purchase by the investor. Various embodiments are described below in connection with the figures provided herein.

The computer-implemented system and method supporting microfinance funds aggregation of the various embodiments described herein enable investors to purchase securities as facilitated by a host site. As described herein, the host site can be considered a network-accessible server, server farm, web site, or the like that can enable network access to and between an investor site, a security issuer site, and a financial site via a network (e.g. the Internet). 1 illustrates an example embodiment of a networked system 100 in which various embodiments may operate. As shown in 1, a host site 110 is in data communication with one or more client (e.g., investor) systems 115 via a conventional network 105, such as the Internet. Client systems 115 can be used by individual investors who can log into the host site 110 via the network 105 and become subscribers or members of the service enabled by the various embodiments described herein. Users of client systems 115 (e.g., investors) can also use the host site 110 to facilitate the purchase of securities as described in more detail below. Investors at investor sites 115 can be everyday people who want to invest some of their savings to produce a financial return and a social impact. Investors are typically retail investors who may not have large sums of money to invest in a particular security. Security issuers at security issuer sites 120 can offer security products (investments) 121 for sale on the host site 110. In the embodiments shown in FIGS. 1-3, the security issuer 120 and financial services provider 125 are shown as network connected sites. However, the security issuer 120 can also be an entirely separate entity that is not in direct data communication with the host site 110 or investor site 115. Typically, the financial services provider 125 has both investor and security issuer accounts. As described in more detail below, using host site 110, investors can purchase investments from security issuers using a list of available securities 116. Purchased securities are issued by the security issuers 120 while the host site 110 provides the list of available securities 116 for viewing by the investor 115. Investors can use their accounts 126 at a financial site, such as a bank or a service like PayPal 125 to fund their security purchases. The security issuers are responsible for making interest and principal payments to the investors. The security issuers can use the funds generated by the sale of securities to invest in microfinance loan packages 128 offered to lending organizations. Again, in the embodiments shown in FIGS. 1-3, the lender 127 and borrower 130 are shown as entirely separate entities that may not be in direct data communication with the host site 110, investor site 115, or security issuer 120. Lending organizations 127 are typically located throughout the world, particularly in developing countries. The lender 127 and security issuer 120 can also be the same site/organization. Additionally, the lender 127 and the issuer site 120 can be the same entity. The lending organizations specialize in making small loans (i.e., microfinance loans) to the world's working poor, who are often the borrowers 130. The lending organizations can also provide other services, such as training, counseling, and health care to the borrowers 130. The security issuers 120 provide microfinance loan packages 128 to the lenders 127, the microfinance loan packages 128 being funded by aggregated investments received from the investors 115. The lending organizations can then provide loans 129 to the borrowers 130, as funded by the security issuer microfinance loan packages 128. The borrowers 130 can use the proceeds of their loan 129 to fund the growth of small businesses in developing countries and thus improve the social well-being of the country's population. Profits obtained from these borrower businesses can be used to repay the loan 129. As the loans 129 are repaid by the borrower 130 to the lending organizations 127, the lending organizations 127 can repay the security issuers 120 on the microfinance loan packages 128. The security issuers 120 can then make interest and principal payments on the securities 116 to the investors 115. Although the flow of capital is as described above, there is not necessarily a one-to-one correlation between the pay outs and the pay backs. For example, a security issuer, such as Calvert, could raise a million dollars from investors using the various embodiments described herein and then lend the million dollars to the lenders at 7% interest. The lenders could then make a large number of small loans to borrowers using the money received from Calvert. Calvert can pay 3% interest to the investors quarterly even if the lenders pay the 7% back to Calvert annually.

Figure 2:
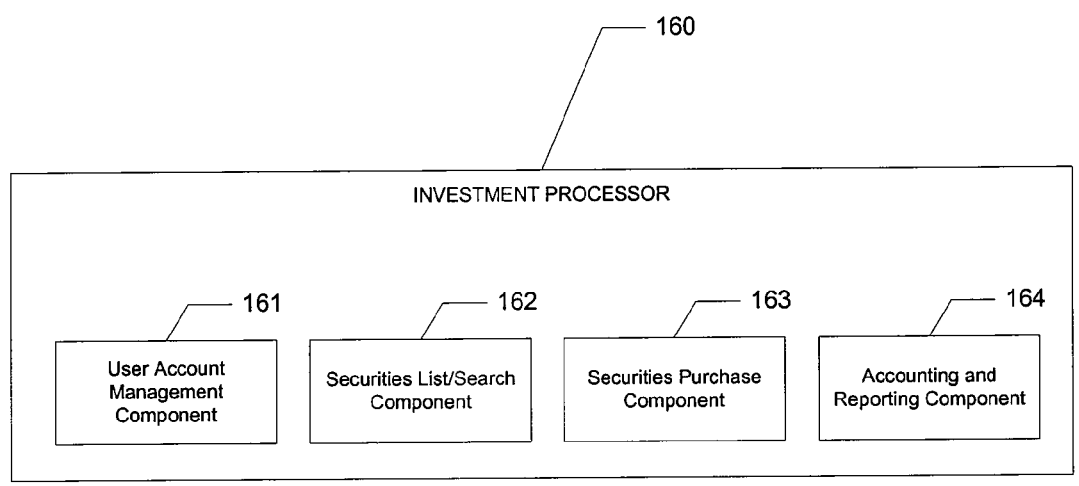
FIG. 2 illustrates an example embodiment showing the functionality components of the investment processor.

In a particular embodiment shown in 1, the microfinance funds aggregation system can be provided in or hosted by host site 110. It will be apparent to those of ordinary skill in the art that an equivalent configuration could include multiple host sites, each managing a portion of the functionality provided by the microfinance funds aggregation system described herein. A particular embodiment includes an additional layer, called the Partner Sites, wherein each Partner Site is hosted on a separate server and each Partner Site communicates with the microfinance funds aggregation system, described in more detail below. In this embodiment, each Partner Site can manage a portion of the functionality provided by the microfinance funds aggregation system described herein. Further, it will be apparent to those of ordinary skill in the art that another equivalent configuration could include a portion of the functionality provided by the microfinance funds aggregation system being downloaded to sites 115, 120, 125, and 127 and executed locally at these sites. In any of these alternative configurations, the microfinance funds aggregation system described herein enables and supports a computer-implemented system and method supporting microfinance funds aggregation for a retail investor. The various features of the system and method will be described in more detail below.
Description of the Computer-implemented Microfinance Funds Aggregation Processor of an Example Embodiment Referring now to 2, an example embodiment showing the functionality components of investment processor 160 is shown. As illustrated in FIG. 1, a host site 110 can be in data communication with one or more investor sites 115 via a conventional network 105, such as the Internet. As such, the investment processor 160 can receive service requests and data from a plurality of investor sites 115. The functionality provided by the investment processor 160 of a particular embodiment to support the plurality of users and service requests can be partitioned into a set of functional components 161-164 as shown in 2. It will be understood that these functional components can be implemented in software executing on the host site server 110 and/or at other partner sites. As described above, other equivalent configurations can also be implemented.

In a first functional component, a user account management component 161 is provided as part of the investment processor 160. The user account management component 161 provides the functionality with which users can create personal accounts on host site 110 and log into their accounts via network 105. The user account management component 161 also provides the functionality with which users can create and edit their user profiles. User profiles are collections of data related to a user that describe the user's characteristics, demographics, preferences, interests, backgrounds, and the like. User profiles can also retain information related to a user's investment strategy, time horizon, risk tolerance, social goals, cash/credit limits, and the like. User profiles can also retain links to other user/investor information, which may ultimately be uploaded to the host site 110 by conventional means. As described below in connection with 3, user profile data can also include commercial information or other user data that can be obtained from $3^{rd}$ party websites. The user account management component 161 provides the functionality and interfaces to create, use, modify, and manage the user account and user profile information.

In a second functional component, a Securities List/Search Component 162 is provided as part of investment processor 160. The Securities List/Search Component 162 provides a searchable list of available securities that an investor may purchase. The available securities are typically provided by the security issuer 120 as information entered through an interface/website inside the host site 110. A list of the available securities can be compiled and presented to an investor via a user interface provided by the Securities List/Search Component 162 of host site 110. Component 162 functionality enables an investor at site 115 to use the user interface provided by the Securities List/Search Component 162 to search for a desired security and initiate a purchase transaction.

In a third functional component, a Securities Purchase Component 163 is provided as part of investment processor 160. The Securities Purchase Component 163 provides functionality enabling an investor at site 115 to use a user interface provided by the Securities Purchase Component 163 to purchase a desired security. The details of a security purchase transaction are described below.

In a fourth functional component, an Accounting and Reporting Component 164 is provided as part of investment processor 160. The Accounting and Reporting Component 164 provides functionality enabling an investor at site 115 to use a user interface provided by the Accounting and Reporting Component 164 to manage their investment portfolio on host site 110. The Accounting and Reporting Component 164 also provides access-protected functionality enabling an administrator at host site 110 to use a secure user interface provided by the Accounting and Reporting Component 164 to monitor and manage the investment portfolios of all investors using host site 110. The Accounting and Reporting Component 164 also provides access-protected functionality enabling an administrator at host site 110 to use a secure user interface provided by the Accounting and Reporting Component 164 to audit activity on host site 110 and produce necessary reports for regulatory agencies. The Customer Service Site described above can also be used for this purpose.

Figure 3:
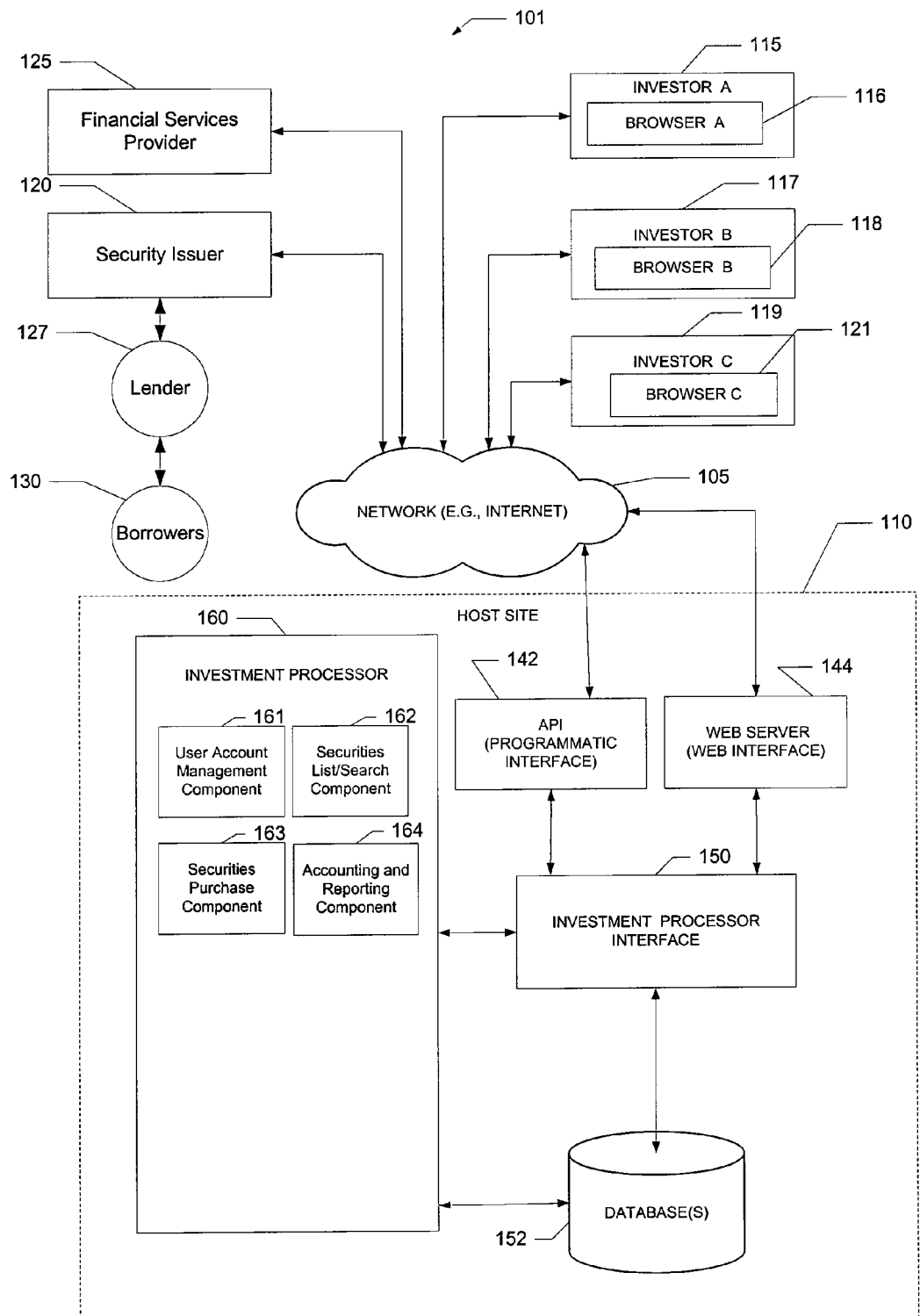
FIG. 3 illustrates another example embodiment of a networked system in which various embodiments may operate.

FIG. 3 illustrates another example embodiment of a networked system 101 in which various embodiments may operate. As illustrated, investment processor 160 is shown as a component of a host site 110 in an example embodiment. Investment processor 160 can use an investment processor interface 150 to send and receive data from investor systems 115, 117, and 119 via network 105. In a particular embodiment, investment processor interface 150 can send and receive data from investor systems 115, 117, and 119 via a web server 144 or an application programming interface 142. If financial services provider 125 and security issuer 120 are network-connected to the host site 110, the Investment processor interface 150 can also be used to send and receive data from sites 120 and 125 via a web server 144 or an application programming interface 142. Sites 120 and 125 can be used to obtain or provide investment/security processing services or commercial information related to members/investors (e.g. credit or purchasing history) or advertising information for advertising on host site 110. Sites 120 and 125 can also be used to obtain or provide information related to investors (e.g. investment information, social/cultural information, reviews, etc.). This information can be used to further customize the investment processing operations performed by various embodiments.

In an alternative embodiment, targeted investment/security product suggestions can be offered to investors based on past investor behavior or investor profiles. Because host site 110 has access to profile and investment information related to each member/investor, host site 110 can target investment/security product listings to particular members based on the demographic information in a member's profile. Investment/security product listings can also be targeted based on the types of investments maintained by a particular member. As a further benefit of a particular embodiment, this demographic and/or investment information can be made anonymous and then made available to third parties through an application programming interface (API). The identity and personal information from the profile can be omitted and protected from access by third parties. The demographic and/or investment information collected by the host site 110 can be used by third parties to generate demographic or psychological models for use in marketing or sales campaigns, research projects, political profiling, or the like.

Figure 4:
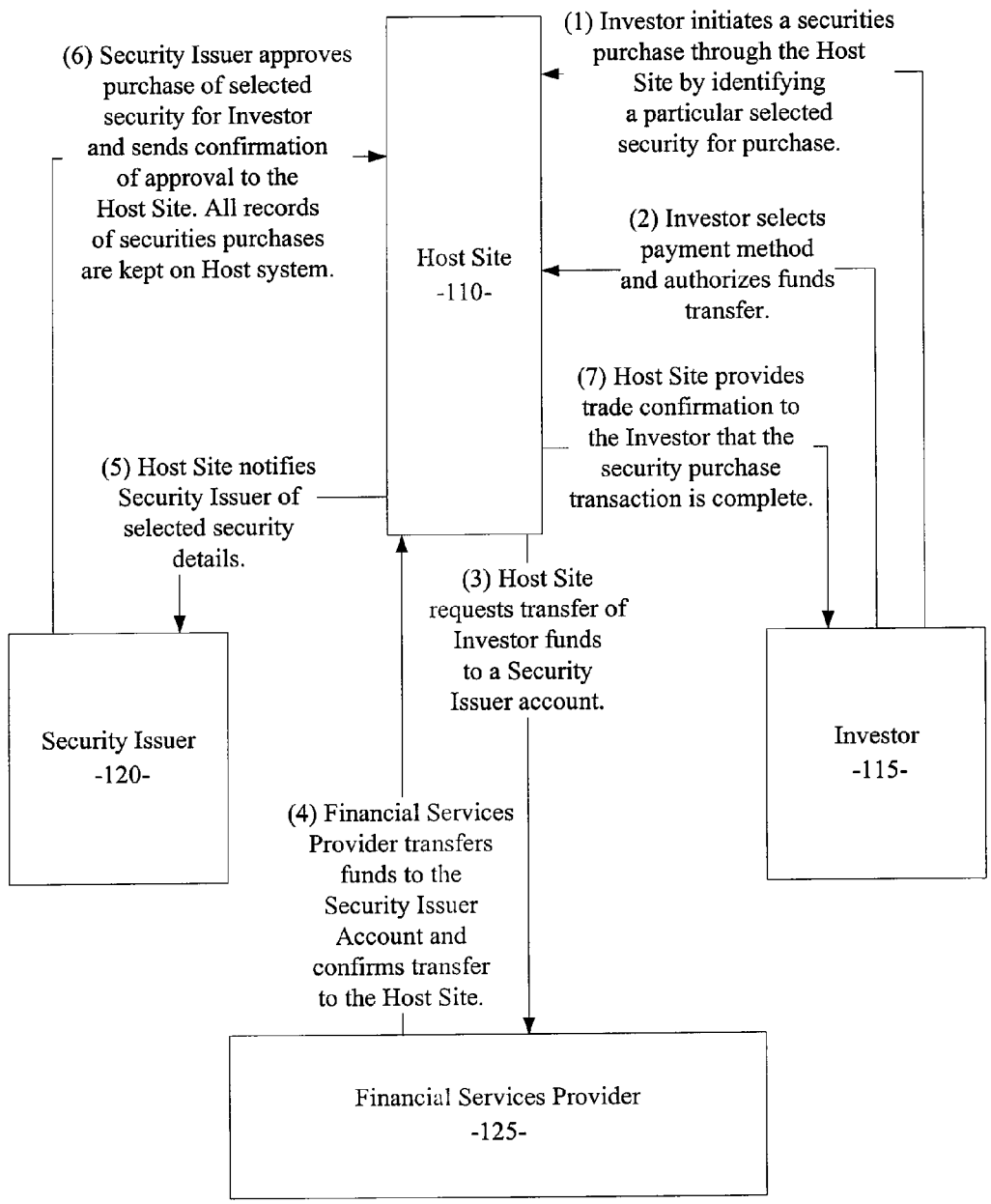
FIG. 4 is a sequence diagram illustrating a sequence of operations in a security purchase transaction of an example embodiment.

FIG. 4 is a sequence diagram illustrating a sequence of operations in a security purchase transaction of an example embodiment. The example sequence of operations shown includes data interactions between a host site 110, an investor site 115, a security issuer site 120, and a financial site 125. As described above, each of these sites do not need to be directly network-connected for various alternative embodiments. In the example shown, a user of investor site 115 (investor) can represent an originator or source of a security purchase transaction as described above. Using the user interface of the Securities List/Search Component 162 described above, and investor at site 115 can search for and identify a particular security for purchase. Once a particular security for purchase is identified, the sequence of operations in a security purchase transaction of an example embodiment can be performed as shown in 4. In an initial operation, the user of investor site 115 can log into the host site 110 and create or edit their user account and profile. In a next series of operations, the user of investor site 115 can search for a desired security and initiate a securities purchase transaction. In a first operation (1) shown in 4, the investor can use the user interface of the Securities List/Search Component 162 to identify a particular selected security for purchase on the host site 110. In a second operation (2) shown in 4, the investor can select a payment method and authorize payment for the selected security at Financial Site 125. In a third operation (3), the Host Site 110 can verify the presence of investor funds in an investor account at Financial Site 125 and can request authorization to transfer the investor funds to a security issuer 120 account. In a fourth operation (4), The Financial Site 125 can transfer the investor funds to the security issuer account and confirm the transfer to the Host Site 110. In a fifth operation (5), the Host Site 11 can notify the security issuer 120 of the details of the selected investment. In a sixth operation (6), the Security issuer 120 can approve the purchase of the selected investment for the investor and can send confirmation of the approved investment purchase to the Host Site 110. In a particular embodiment, all records of investment purchases can be kept on the Host Site 110. In a seventh operation (7), the Host Site 110 can provide a trade confirmation and/or a receipt to the investor via investor site 115 verifying that the security purchase transaction is complete.

Figure 5:
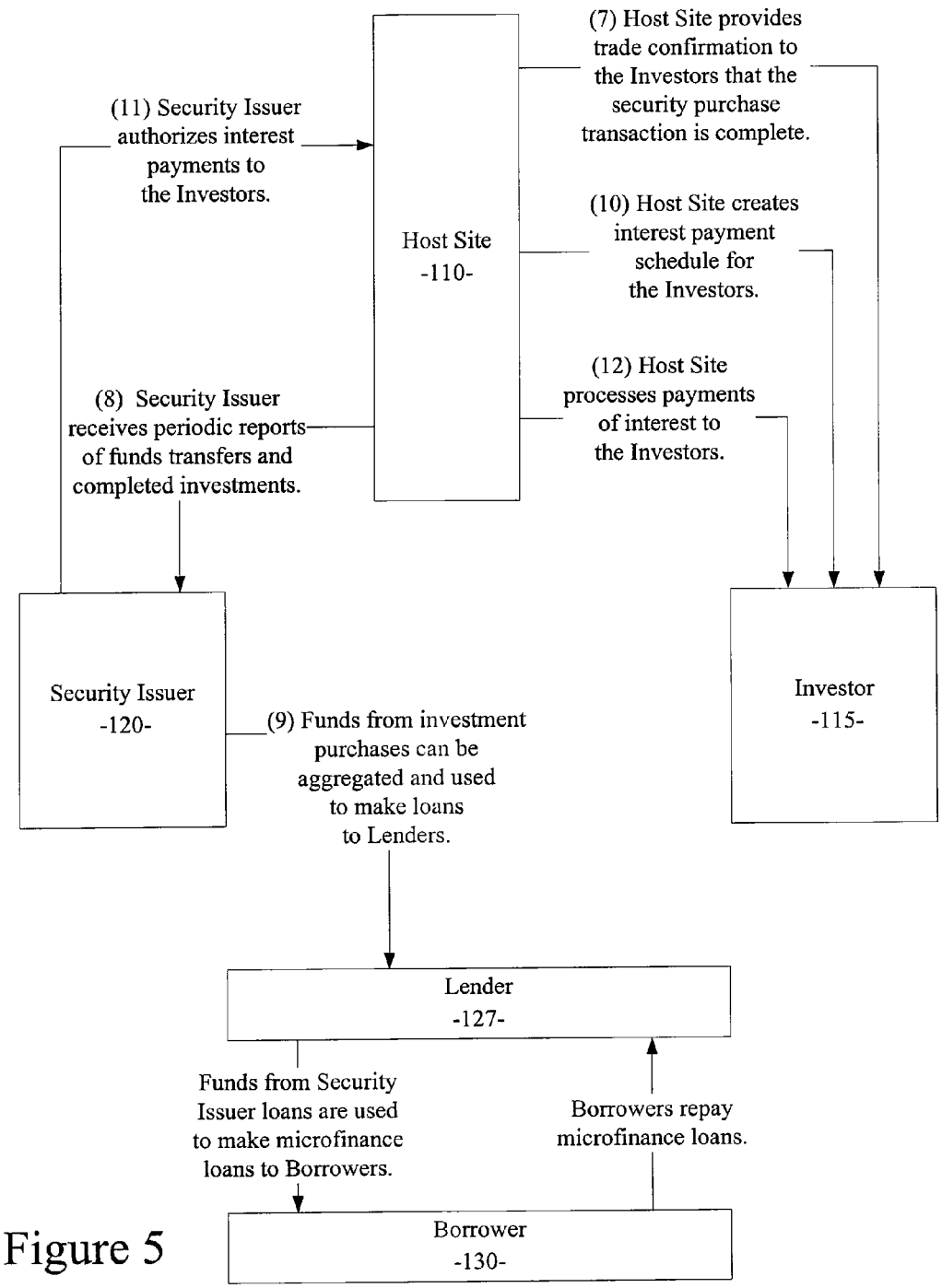
FIG. 5 is a sequence diagram illustrating a continuing sequence of operations in a security purchase transaction of an example embodiment.

FIG. 5 is a sequence diagram illustrating a continuing sequence of operations in a security purchase transaction of an example embodiment. The example sequence of operations shown in 5 includes a continuation of the sequence of operations performed for a security purchase transaction illustrated in FIG. 4. The example sequence of operations shown in 5 includes interactions between a host site 110, an investor site 115, a security issuer 120, a financial site 125, and a lender 127. As described above in relation to 4 and also shown in 5, in an eighth operation (8), the Security issuer 120 can receive periodic reports of funds transfers and completed investments from Host Site 110. As shown in 5, in a ninth operation (9), the Security issuer 120 can aggregate Investor funds into a microfinance loan package 128 that the security issuer 120 can offer to lender 127. The lender 127 can then offer micro loans to borrowers 130 using the proceeds from the microfinance loan package 128 provided by the security issuer 120. Note that the interaction between the security issuer 120 and the lender 127 and between the lender 127 and borrower 130 can be offline and completely separate from the data interactions between the host site 110 and the investor 115. In a tenth operation (10), the host site 110 can create an interest payment schedule for the investor 115. In an alternative embodiment, the host site 110 can create an interest payment schedule for the investor 115 upon trade confirmation. In an eleventh operation (11), Host Site 110 notifies the security issuer 120 of the amounts that need to be paid to the investors 115 as interest on their investments. The security issuer 120 then authorizes the Host Site 110 to make the necessary interest payments to the investors 115. The Host Site 110 then executes the payment transaction transferring money from the security issuer's accounts to the investors. In a particular embodiment, the Host Site 110 can effect this payment transaction via an interaction with the financial services provider site 125. The Host Site 110 can transfer funds from a security issuer's account on the financial services provider site 125 to an investor account on the financial services provider site 125. In a twelfth operation (12), the Host Site 110 can confirm the payment of loan interest to the particular investor who purchased the security that funded the loan.

Figure 6:
FIGS. 6-8 illustrate the user account and profile establishment process of a particular embodiment.
Figure 7:
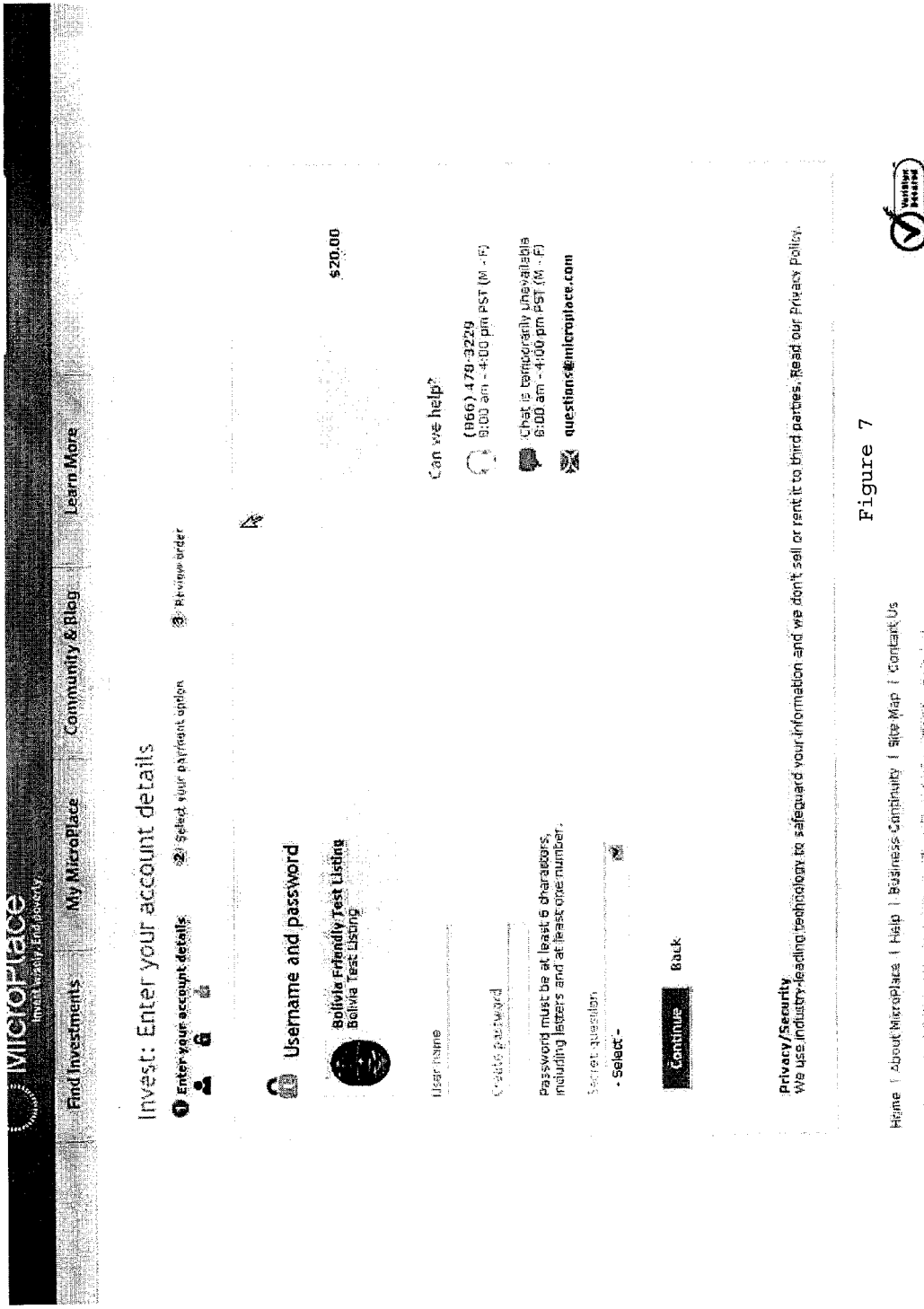
Figure 8:
Figure 10:
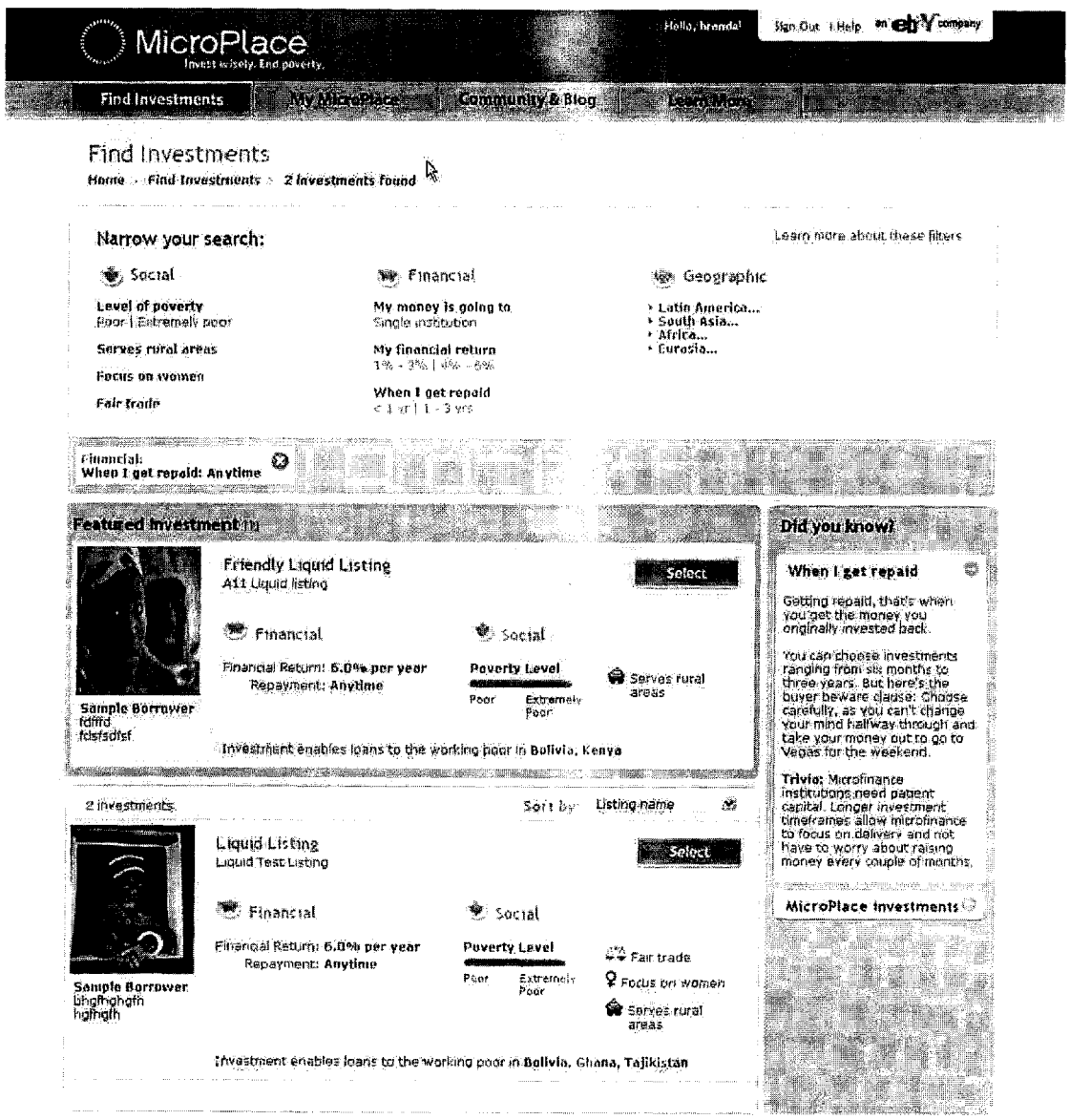
Figure 11:
Figure 12:
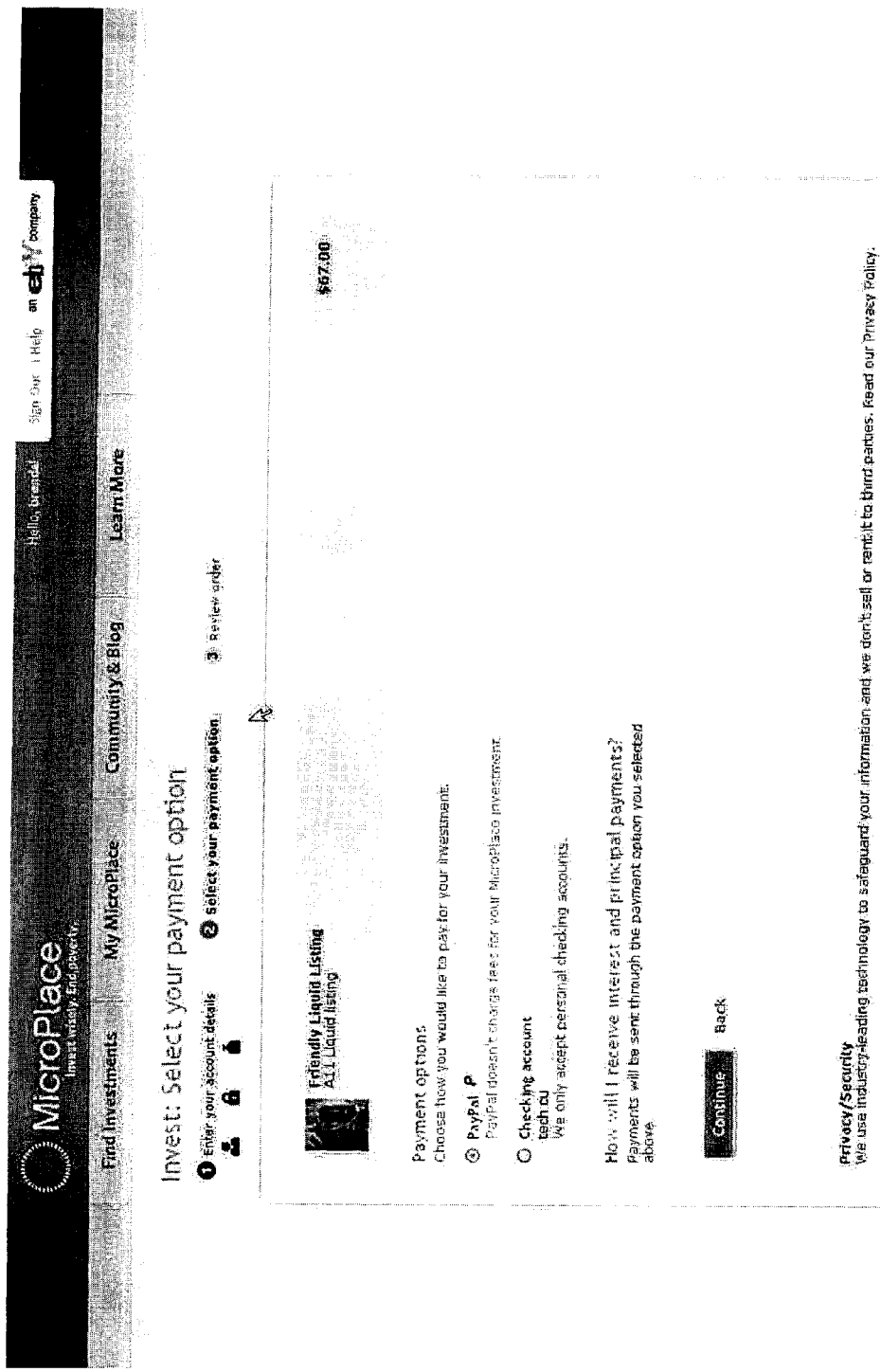
Figure 14:
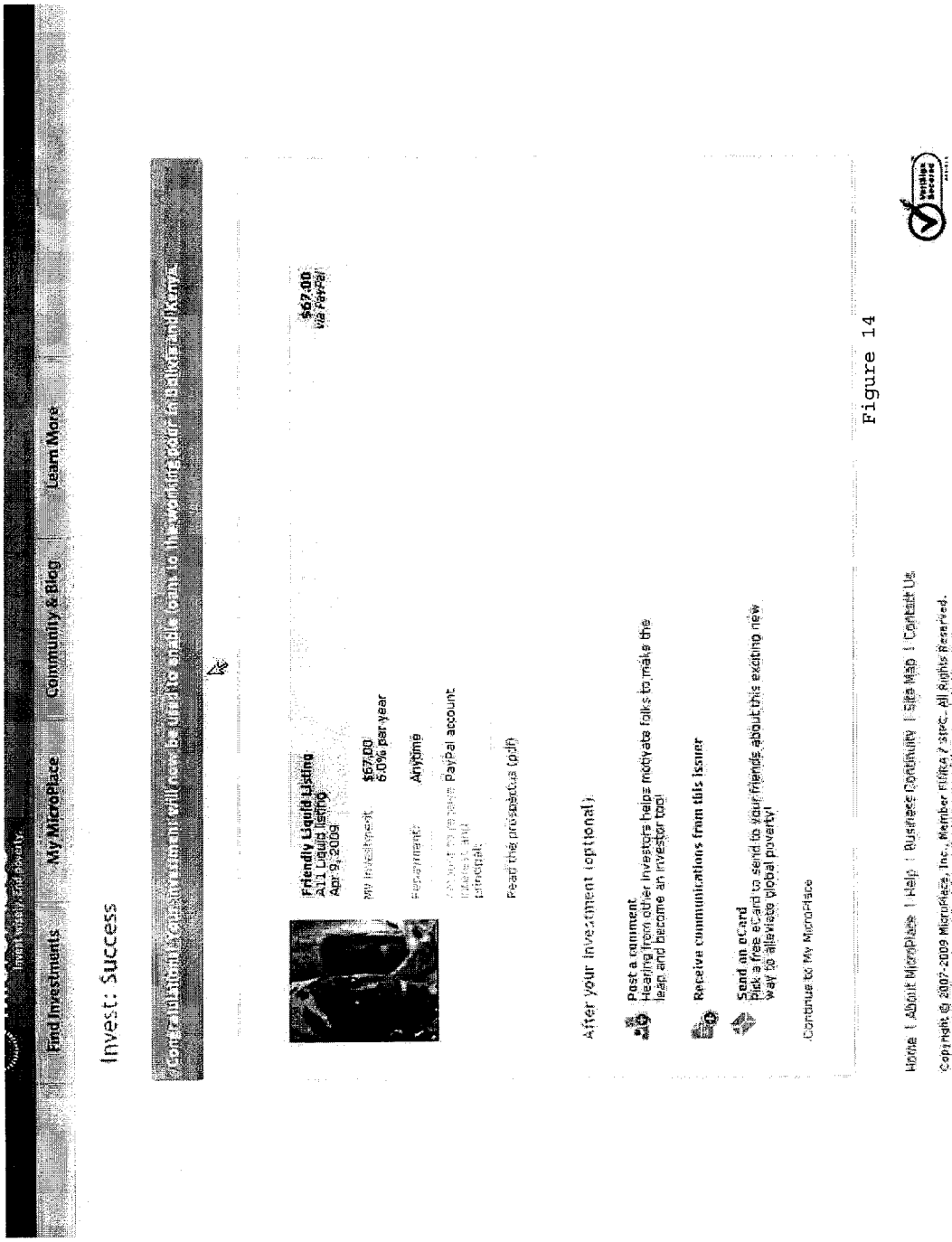
Figure 15:
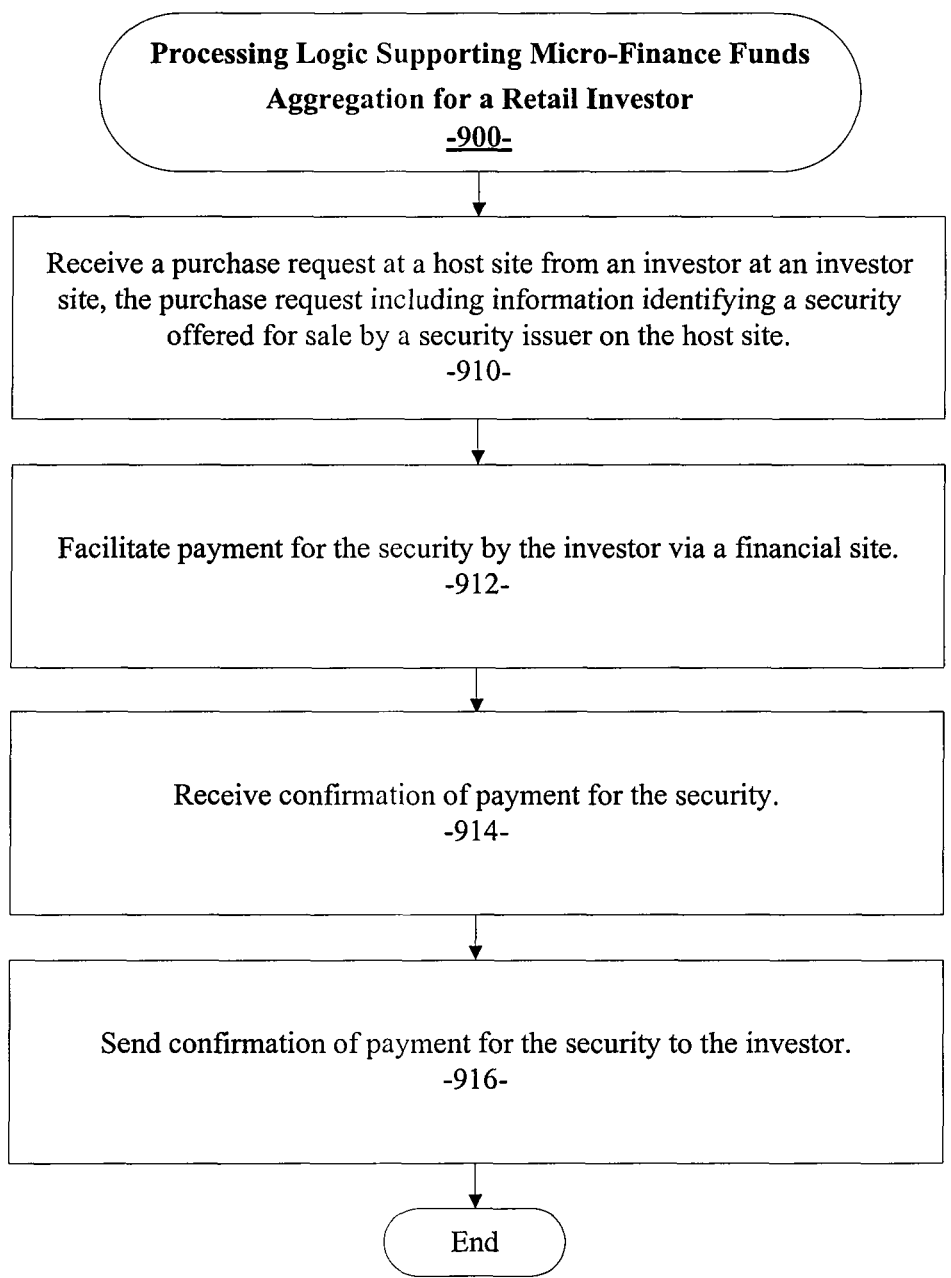
FIG. 15 is a flow diagram illustrating the processing flow in various embodiments.

Referring to FIGS. 6-8, the user account and profile establishment process of a particular embodiment is illustrated. This process and its related functionality can be implemented in the user account management component 161 described above. As provided in the user account management component 161, an Investor can browse the Host Site 110 and look for investment opportunities without opening a Host Site account. However, in a particular embodiment, an Investor may create a Host Site account before making an investment. Opening a Host Site account can occur online through the Host Site 110. In a particular embodiment, there are three steps in the online account opening process. These steps are described below.

1. Identity Verification
   a. This step collects information from the Investor to verify their identity and age.
   b. The Investor is allowed to proceed through the next step of account opening only if:
      i. they have provided all requested information in the accurate format,
      ii. their Social Security Number (SSN) does not already exist in the system,
      iii. they are over eighteen years of age, and
      iv. the third party used to authenticate the customer has verified the
      identity of the Investor based on the data collected.
2. Employment and Financial Information
   a. This step collects information about the Investor's employer, employment status, financial status and investment objectives.
3. Login Information
   a. This step allows the Investor to specify information to identify their account on the Host Site and authenticate themselves to access their account information.

In a particular embodiment, the Investor is required to agree to the terms of a Host Site User Agreement, Privacy Policy and to electronic delivery of information before completing the account opening process. Information provided during the account opening process, including the electronic acceptance of terms, is stored in the Host Site 110 as the Investor Profile. The Investor will receive a welcome email confirming their account opening.

Referring to FIGS. 9-14, the user investment search, investment selection, order entry, payment selection, and order review processes of a particular embodiment are illustrated. The order entry process on the Host Site 115 is executed online. In a particular embodiment, there are three steps to the process. These steps are described below.

1. Select an Investment
2. Choose Payment Method
3. Purchase Investment

In the Select Investment operation of a particular embodiment, the following process is provided:

1. The Investor can use interactive menus and search tools to select from a list of investment listings.
2. The Investor can see a list of investment opportunities (listings) that could be used to fund microfinance organizations.
3. The Investor can view details of the investment opportunity including the Prospectus and the details of the organization to which the investment revenue will be directed.
4. The Investor can enter the investment amount and select the desired investment for purchase.

In a particular embodiment, a Select Your Payment Option process is provided. In the Select Your Payment Option operation of a particular embodiment, the following process can be provided:

1. The Investor can select to pay via conventional PayPal, checking account, or Automated Clearing House (ACH).

2. Selecting PayPal will result in the Investor being sent to a PayPal hosted site for authentication. The Investor is returned to the Host Site when PayPal has authenticated the Investor. The Host Site receives an authentication token from PayPal.

3. Selecting ACH will require the Investor to add a bank account if they do not have one on file or choose a bank account if they have previously added one to their profile.

In a particular embodiment, an Investment Purchase process is provided. In the Investment Purchase operation of a particular embodiment, the following process is provided:
1. The Investor reviews their investment selection.
2. The Investor is asked to confirm their investment objectives and payment information.
3. The Investor places the order.
4. The system performs a suitability check.
5. The system processes the payment instruction, if the order passes all suitability checks.
6. The system displays an alert message if the Investor's total investment is greater than the warning trigger amount for their selected liquid asset range. The Investor can choose to override the warning.
7. The system accepts the order and processes the payment, if the Investor overrides the warning and the total investment amount is less than the system order maximum.
8. The system accepts the order and places the investment in a pending status for review by an administrator if the total investment amount is greater than the system order maximum.
9. The Investor is able to view a page that displays the status of their investment order.
10. The investment status at the end of the checkout process can be:
    a. Pending review and approval by an administrator (a data processing administrator or DP),
    b. Pending funds confirmation if the payment has been processed but the payment processing system has not confirmed the transfer of funds,
    c. Pending issue of trade confirmation, if the payment has been successfully processed and the funds transfer is successful, or
    d. Rejected if the payment processing failed.
11. The Investor sees the status of their order on the Order Receipt Page.
12. The Investor also receives an email with the status of the order.

In a particular embodiment, an order execution process is provided. In the Order Execution Process of a particular embodiment, the following process operations are provided:
1. The investment status at the end of the checkout process can be:
    a. Pending review and approval by an administrator.
    b. Pending funds confirmation if the payment has been processed but the payment processing system has not confirmed the transfer of funds.
    c. Pending issue of trade confirmation if the payment has been successfully processed and the funds transfer is successful.
    d. Rejected if the payment processing failed.
2. Investments pending approval
    a. On a daily basis, the DP can review all orders pending approval.
    b. The DP can approve or reject an order.
    c. System will process payments for orders that are approved.
3. Investments pending funds confirmation
    a. The payment processing system will notify the Host Site 110 when funds transfer from the Investor to the Issuer is completed.
    b. System receives this notification electronically and automatically updates the transaction status to pending issue of trade confirmation.
    c. The system generates an interest payment schedule for each investment.
4. The Host Site 110 provides a daily report of all investments for which the funds are confirmed to the Issuer. Issuer confirms receipt of funds through an interface provided by the Host Site 110.
5. The Host Site 110 sends notification via email of the availability of the trade confirmation to all Investors whose investments are approved by the Issuer.
6. Investors can log in to My Host Site (the investor account management process, described below) and view their trade confirmations.

In a particular embodiment, a payment process is provided. The Host Site 110 can be a technology enabler of the payment process. The Host Site 110 can facilitate the funds flow directly between the Investor and the Security Issuer (herein, Issuer). The Investor can pay using PayPal, ACH, or some other conventional payment mechanism. The Host Site 110 can integrate with PayPal to facilitate any payment mechanism. The following paragraphs describe the detailed payment flows for a particular embodiment using PayPal or ACH.

A. PayPal
1. Issuer Set Up
    The Issuer signs an agreement with PayPal and opens up a PayPal account to receive payments for investments purchased by Investors using PayPal on the Host Site 110. The Issuer at site 120 identifies the Host Site 110 as a third party submitter of transactions. The Host Site 110 is assigned an identifier to use when submitting transactions on the Issuer's behalf. The Host Site 110 access to the Issuer PayPal account is restricted to transaction submission.
2. Website Flow
    The Investor can elect to pay by PayPal on the PayPal site (or other Financial Site 125). The Host Site 110 can redirect the Investor to a PayPal webpage. The Investor can sign into PayPal. PayPal can authenticate the Investor and pass to the Host Site 110 a token to identify the customer.
3. Payment Processing Flow
    The Host Site 110 can be integrated to PayPal through an Application Programming Interface (API). The system uses the API to forward the payment instruction to PayPal. The payment instruction is created and sent to PayPal either during the online order acceptance process or after the order is manually approved by the DP. The payment instruction specifies the Issuer, the Host Site 110 identifier as an authorized third party of the Issuer, the authentication token received from PayPal by the Host Site 110, and the investment amount. A payment transaction is submitted for each investment. PayPal ensures that all submitted identifiers for each investment are valid. PayPal provides a transaction identifier for each investment and confirms if the transaction was successfully received by PayPal. PayPal then transfers funds from the Investor's PayPal account to the Issuer's PayPal account. PayPal notifies the Host Site 110, the Issuer, and the Investor that the funds transfer is complete. The Host Site 110 can set the investment status to Pending Trade Confirmation.

B. ACH
1. Issuer Set Up

The Issuer signs an agreement with PayPal Payflow Gateway and opens up a gateway account to receive payments for investments purchased by Investors using PayPal on the Host Site 110. The Issuer provides the gateway with the actual bank account information to which funds should be transferred. The Issuer identifies the Host Site 110 as a third party submitter of transactions. The Host Site 110 is assigned an identifier to use when submitting transactions on the Issuer's behalf. The Host Site 110 access to the Issuer PayPal account is restricted to transaction submission.

2. Website Flow

The Investor elects to pay via ACH. The Investor selects an existing bank account from their profile or adds the bank account.

3. Payment Processing Flow

The Host Site 110 can be integrated to PayPal Gateway through an API. The system uses the API to forward the payment instruction to the PayPal gateway The payment instruction is created and sent to PayPal either: 1) During the online order acceptance or process; or 2) After the order is manually approved by the DP. The Payment instruction specifies the Issuer, the Host Site 110 identifier as an authorized third party of the Issuer, bank account information provided by the Investor during checkout, and the investment amount. A payment transaction is submitted for each investment. The PayPal gateway ensures that all submitted identifiers for each investment are valid. The PayPal gateway provides a transaction identifier for each investment and confirms if the transaction was successfully received by PayPal. The gateway translates the instructions received from the Host Site 110 into a file format that is understood by the banking system. This file contains the amount and Investor bank account information received from the Host Site 110 and the Issuer bank account information stored in the gateway system during Issuer set up. The banking system then moves funds from the Investor to the Issuer bank account. The PayPal gateway notifies the Host Site 110 if there is any failure in the transfer of funds. Investments whose payment collection fails are set to Failed in the system. The Investor is sent an email notification that their investment payment failed. The Host Site 110 sets the status of failed investments that have failed to Rejected. The rest of the investments are set to Pending Trade Confirmation.

In a particular embodiment, an investor account management process (denoted My Host Site) is provided. Investors can log in to the My Host Site section of the Host Site 110 website at any time to perform the following functions:

1. Review investment status
2. View investment transaction history
3. View trade confirmations
4. View account statements
5. Make modifications to their Investor profile including changes to their financial statement and investment objectives.

The Investor receives an email alert if changes are made to the Investor's profile. The system will not allow the Investor to change elements of the profile such as bank account information and SSN. The system will attempt to re-verify the Investor's identity, if the Investor changes any data elements that were used to authenticate the Investor initially. Trade confirmations and quarterly statements are generated by the system and made available to the Investor on My Host Site. The Investor can receive an email notification that these documents are available to view and download online. The system will attempt to deliver email notifications regarding Investor profile changes three times. The system will create an exception report after the third unsuccessful attempt to send these notifications. Notification will then be sent via regular mail to the address provided.

In a particular embodiment, an interest payment process is provided. Investor disbursements of interest and principal are made periodically. In a particular embodiment, periodic payments can be made monthly, quarterly, semi-annually, annually, or at end of loan term. The Host Site 110 notifies the Issuer when interest and principal payments are due. Investors receive disbursements on a quarterly cycle. The system creates the Investor Disbursement Due report at the beginning of the month. This report contains the calculation of all amounts due to Investors for each individual security. The Issuer can view this report and ensure that their bank and PayPal accounts have sufficient funds to cover the Investor disbursements. The Host Site 110 can notify the Issuer on the 15th of the month that disbursements have to be approved. The Issuer can log into the Issuer Portal and approve the Investor disbursements. The system can create the payment instructions and forward them to PayPal or the PayPal ACH gateway. The payment processors execute the payment instructions. Funds can then flow from the Issuer to the Investor's bank or PayPal account. The Investor receives an email indicated that an interest payment has been made. Investors can login and see their interest payments on My Host Site.

In a particular embodiment, a redemption process is provided. The Host Site 110 can facilitate redemption requests. Approval of redemption requests are at the discretion of the Issuer. Redemption payments are processed weekly, in a particular embodiment. The Investor can contact Host Site 110 customer service to request early redemption of funds. The Host Site 110 can authenticate the Investor and ensure that the Investor is in good standing (e.g., no evidence of suspicious transaction activity). A request for redemption order is created in the system by the Host Site 110 customer service representative. The system creates a Redemption Request Review Report on a weekly basis. This report is reviewed by the Issuer to ensure that there are sufficient finds to cover the disbursement of funds to the Investor. The Issuer is notified by the Host Site 110 on the date redemption payments are processed to approve the requests. The Issuer can then approve the requests. The system can create the payment instructions and forward them to PayPal or the PayPal ACH gateway. The payment processors can then execute the payment instructions. Funds flow from the Issuer to the Investor's bank or PayPal account. The Investor receives an email indicating that a redemption confirmation is available on My Host Site. Investors can login and see the cancellation of their security on My Host Site. Redemptions can be processed daily or at other periodic intervals.

As shown in 15, processing operations performed by another example embodiment 900 include: receiving a purchase request at a host site from an investor at an investor site, the purchase request including information identifying a security offered for sale by a security issuer on the host site (processing block 910); facilitating payment for the security by the investor via a financial site (processing block 912); receiving confirmation of payment for the security (processing block 914); and sending confirmation of payment for the security to the investor (processing block 916).

Figure 16:
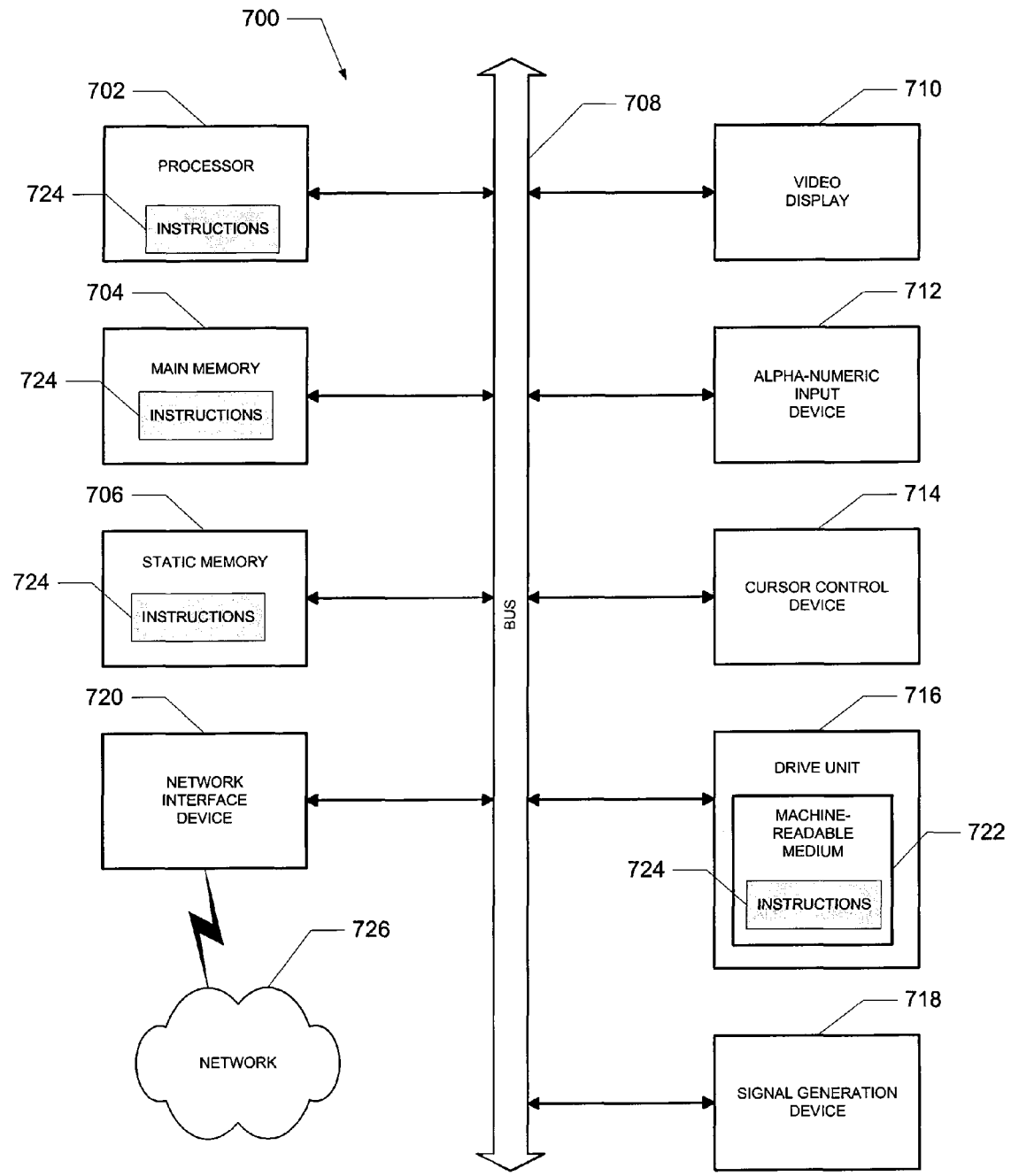
FIG. 16 is a block diagram of a computer system on which an embodiment may operate.

FIG. 16 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hardwired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, computer-implemented system and method supporting microfinance funds aggregation for a retail investor are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
providing, by use of a processor, a list of available securities offered for sale by a security issuer to a host site;
providing the list of available securities at an investor site via an interface, the interface enabling an investor to select a security from the list of available securities for purchase;
generating a purchase request in response to the investor selecting the security from the list of available securities on the investor site;
receiving the purchase request at the host site from the investor site, the purchase request including information identifying the security selected by the investor;
facilitating, by use of the processor, payment for the security included in the purchase request via a financial site;
receiving, by use of the processor, confirmation of payment for the security; and
sending confirmation of payment for the security to the investor site.

2. The method as claimed in claim 1 wherein the financial site is a PayPal site.

3. The method as claimed in claim 1 wherein the financial site is an ACH site.

4. The method as claimed in claim 1 including enabling the investor to create and use a personal account on the host site.

5. The method as claimed in claim 1 including enabling the host site to facilitate payment of interest on a purchased security to an investor.

6. The method as claimed in claim 1 further including:
enabling an investor to log in at the host site;
enabling an investor to select an available security for sale; and
enabling an investor to initiate a security purchase transaction.

7. A method comprising:
providing, by use of a processor, a list of available securities offered for sale by a security issuer to a host site;
providing the list of available securities at an investor site via an interface, the interface enabling an investor to select a security from the list of available securities for purchase thereby causing generation of a purchase request for the security at the investor site;
facilitating, by use of the processor, purchase of the security by the investor via a financial site;
aggregating investor funds from a plurality of purchased securities into a microfinance loan package by the security issuer;
receiving a loan request for a loan at a lender site from a borrower, the loan being funded by the microfinance loan package;
providing, by use of a processor, the loan to the borrower at the lender site;
receiving payments on the loan; and
facilitating, by use of the processor, payment of loan interest to the security issuer.

8. The method as claimed in claim 7 wherein the loan is funded by investor finds paid by retail investors.

9. An article of manufacture comprising a non-transitory machine readable storage medium having machine executable instructions embedded thereon, which when executed by a machine, cause the machine to:
provide a list of available securities offered for sale by a security issuer to a host site
provide the list of available securities at an investor site via an interface, the interface enabling an investor to select a security from the list of available securities for purchase;
generate a purchase request in response to the investor selecting the security from the list of available securities on the investor site;
receive the purchase request at the host site from the investor site, the purchase request including information identifying the security selected the investor;
facilitate payment for the security included in the purchase request via a financial site;
receive confirmation of payment for the security; and
send confirmation of payment for the security to the investor site.

10. The article of manufacture as claimed in claim 9 wherein the financial site is a PayPal site.

11. The article of manufacture as claimed in claim 9 wherein the financial site is an ACH site.

12. The article of manufacture as claimed in claim 9 being further operable to enable the investor to create and use a personal account on the host site.

13. The article of manufacture as claimed in claim 9 being further operable to enable the host site to facilitate payment of interest on a purchased security to an investor.

14. The article of manufacture as claimed in claim 9 being further operable to:
enable an investor to log in at the host site;
enable an investor to select an available security for sale; and
enable an investor to initiate a security purchase transaction.

15. An article of manufacture comprising a non-transitory machine readable storage medium having machine executable instructions embedded thereon, which when executed by a machine, cause the machine to:
provide a list of available securities offered for sale by a security issuer to a host site;

provide the list of available securities at an investor site via an interface, the interface enabling an investor to select a security from the list of available securities for purchase thereby causing generation of a purchase request for the security at the investor site;

facilitate purchase of the security by the investor via a financial site;

aggregate investor funds from a plurality of purchased securities into a microfinance loan package by the security issuer;

receive a loan request for a loan at a lender site from a borrower, the loan being funded by the microfinance loan package;

provide the loan to the borrower at the lender site;

receive payments on the loan; and facilitate payment of loan interest to the security issuer.

16. The article of manufacture as claimed in claim 15 wherein the loan is funded by investor funds paid by retail investors.

17. A system comprising:

a processor;

a memory coupled to the processor to store infromation related to an investor; and an investment processor operably coupled with the processor and the memory, operable to provide a list of available securities offered for sale by a security issuer to a host site;

to provide the list of available securities at an investor site via an interface, and the interface enabling the investor to select a security from the list of available securities for purchase thereby causing generation of a purchase request for the security at an investor site;

to facilitate purchase of the security by the investor via a financial site;

to aggregate investor funds from a plurality of purchased securities into a microfinance loan package by a security issuer;

to receive a loan request for a loan at a lender site from a borrower, the loan being funded by investor funds used to purchase a security issued by a security issuer;

to provide the loan to the borrower at the lender site;

to receive payments on the loan; and to facilitate payment of loan interest to the security issuer.

18. The system as claimed in claim 17 being further operable to enable the investor to create and use a personal account on the host site.

19. The system as claimed in claim 17 being further operable to enable the host site to facilitate payment of interest on a purchased security to an investor.

* * * * *